United States Patent
Caird et al.

(10) Patent No.: US 10,951,508 B2
(45) Date of Patent: Mar. 16, 2021

(54) END-TO-END DATA PATH INTEGRITY VALIDATION AT LAYER 2

(71) Applicant: Ciena Corporation, Hanover, MD (US)

(72) Inventors: Ross Caird, Kanata (CA); Michael Watford, Kanata (CA)

(73) Assignee: Ciena Corporation, Hanover, MD (US)

( * ) Notice: Subject to any disclaimer, the term of this patent is extended or adjusted under 35 U.S.C. 154(b) by 55 days.

(21) Appl. No.: 15/865,315

(22) Filed: Jan. 9, 2018

(65) Prior Publication Data

US 2019/0215261 A1 Jul. 11, 2019

(51) Int. Cl.
| | |
|---|---|
| *H04L 12/26* | (2006.01) |
| *H04J 3/14* | (2006.01) |
| *H04L 29/12* | (2006.01) |
| *H04L 12/46* | (2006.01) |
| *H04J 3/16* | (2006.01) |

(52) U.S. Cl.
CPC .............. *H04L 43/50* (2013.01); *H04J 3/14* (2013.01); *H04J 3/1664* (2013.01); *H04L 43/06* (2013.01); *H04L 43/065* (2013.01); *H04L 43/10* (2013.01); *H04L 61/2592* (2013.01); *H04J 2203/006* (2013.01); *H04L 12/4641* (2013.01); *H04L 43/16* (2013.01)

(58) Field of Classification Search
CPC ..... H04L 43/50; H04L 61/2592; H04L 43/06; H04L 12/4641; H04J 3/1664; H04J 3/14; H04J 2203/006
See application file for complete search history.

(56) References Cited

U.S. PATENT DOCUMENTS

| | | | |
|---|---|---|---|
| 6,505,310 B1 | 1/2003 | Brown et al. | |
| 6,761,602 B1 | 7/2004 | Quinn | |
| 7,873,073 B2 | 1/2011 | Frlan et al. | |
| 8,160,453 B1 | 4/2012 | Harley et al. | |
| 2001/0039577 A1* | 11/2001 | Barkai | H04L 41/046 709/223 |
| 2003/0051049 A1* | 3/2003 | Noy | H04L 41/5054 709/238 |
| 2006/0242525 A1* | 10/2006 | Hollander | G06F 30/33 714/742 |
| 2007/0019745 A1* | 1/2007 | Donadio | H04L 41/0869 375/259 |
| 2010/0185762 A1* | 7/2010 | Yasuie | H04L 41/0677 709/224 |
| 2012/0092985 A1 | 4/2012 | Caird et al. | |
| 2012/0124121 A1* | 5/2012 | Pope | H04L 49/9094 709/201 |
| 2012/0328289 A1* | 12/2012 | Julien | H04L 49/557 398/45 |

(Continued)

*Primary Examiner* — Harry H Kim
(74) *Attorney, Agent, or Firm* — Clements Bernard Walker; Lawrence A. Baratta, Jr.; Christopher L. Bernard

(57) ABSTRACT

Systems and methods of end-to-end data path integrity validation of a service with a data path at Layer 1 and Layer 2 implemented by a network element include, responsive to initiation of a test, messaging between network elements in the data path to coordinate defect and statistics collection at each of the network elements in the data path; receiving results for the defect and statistics collection from each of the network elements in the data path; and summarizing the received results to form a consolidated report for the test across all of the network elements in the data path.

15 Claims, 16 Drawing Sheets

(56) References Cited

U.S. PATENT DOCUMENTS

| | | |
|---|---|---|
| 2013/0132789 A1 | 5/2013 | Watford et al. |
| 2013/0219052 A1* | 8/2013 | Prakash .................. H04L 41/08 |
| | | 709/224 |
| 2014/0129876 A1* | 5/2014 | Addepalli ........... G06F 11/0709 |
| | | 714/37 |
| 2014/0146662 A1* | 5/2014 | Okabe ................... H04L 41/065 |
| | | 370/225 |
| 2016/0134496 A1* | 5/2016 | Cheng ................... H04L 43/062 |
| | | 709/224 |
| 2016/0182275 A1* | 6/2016 | Viswanadham ... H04B 10/0773 |
| | | 398/1 |
| 2016/0248510 A1 | 8/2016 | Medema et al. |
| 2017/0171163 A1 | 6/2017 | Gareau et al. |
| 2017/0324657 A1* | 11/2017 | Zhong ....................... H04L 1/00 |

\* cited by examiner

FIG. 11

END-TO-END DATA PATH INTEGRITY VALIDATION AT LAYER 2

FIELD OF THE DISCLOSURE

The present disclosure generally relates to networking systems and methods. More particularly, the present disclosure relates to end-to-end data path integrity validation (including aspects of the physical Layer) via Layer 2.

BACKGROUND OF THE DISCLOSURE

For data path integrity validation at Layer 1 and Layer 2, a conventional approach includes a testing feature between two or more nodes, i.e., packet or Ethernet switches. Here, a test signal (such as an IEEE 802.3ab scrambled idle test pattern) can be sent from an initiating node to a destination node under test and back to the initiating node (when there are appropriate loopbacks in place within the network). The test signal can be used to monitor aspects of the physical path (at Layer 1). However, this conventional approach relies on the fact there are no intermediate Layer 2 switches in the data path, so the test signal can determine the characteristics at Layer 1 of the data path. Conventionally, it is not possible to verify the end-to-end data path integrity at Layer 2 where there are one or more intermediate packet switches in the end-to-end data path. This is since the Layer 2 test signal is terminated at each Layer 2 interface within the end-to-end data path. An initiating node's test signal does not flow end-to-end through the complete data path, so the test signal cannot be verified upon reception (at the initiating node), as a result. Also, the conventional approach must also be run "out of service," since the test signal and service traffic are mutually exclusive.

BRIEF SUMMARY OF THE DISCLOSURE

In an embodiment, a method of end-to-end data path integrity validation of a service with a data path at Layer 1 and Layer 2 implemented by a network element includes, responsive to initiation of a test, messaging between network elements in the data path to coordinate defect and statistics collection at each of the network elements in the data path; receiving results for the defect and statistics collection from each of the network elements in the data path; and summarizing the received results to form a consolidated report for the test across all of the network elements in the data path. The received results can include statistics for each interface in the data path, wherein the summarizing includes correlating the received results to provide a single view across the data path. The method can further include reporting the consolidated report to a management system. The received results can include one or more of a default failure threshold and a pass/fail criteria. The messaging and the test can be performed using an encapsulation protocol such that control frames take the same data path as the service. The encapsulation protocol can utilize Virtual Local Area Network (VLAN). The test can be performed in service with the service. The test can be performed out of service with the service using an idle test pattern running on each associated interface for the service. The defect and statistics collection can be at a plurality of a Media Access Control (MAC) layer, a Reconciliation Sublayer (RS), Optical Transport Network (OTN), Ethernet Physical Coding Sublayer (PCS), and a Physical (PHY) layer.

The messaging between network elements in the data path can include the network element sending check messages to each of the network elements in the data path, the network element receiving reply messages from each of the network elements responsive to the check messages, the network element sending start messages to each of the network elements in the data path, and the network element receiving result messages from each of the network elements responsive to the start messages. The method can further include providing consolidated report to a management interface via any of Command Line Interface (CLI), Representational state transfer (REST), Network Configuration Protocol (NETCONF), Simple Network Management Protocol (SNMP), and a g Remote Procedure Call (gRPC). The test can be performed for the service at a same time as another test for another service.

In another embodiment, an apparatus configured for end-to-end data path integrity validation of a service with a data path at Layer 1 and Layer 2 includes circuitry configured to message between network elements in the data path, responsive to initiation of a test, to coordinate defect and statistics collection at each of the network elements in the data path; circuitry configured to receive results for the defect and statistics collection from each of the network elements in the data path; and circuitry configured to summarize the received results to form a consolidated report for the test across all of the network elements in the data path. The received results can include statistics for each interface in the data path, wherein the summarizing includes correlating the received results to provide a single view across the data path. The messaging and the test can be performed using an encapsulation protocol such that control frames take the same data path as the service. The test can be performed in service with the service. The defect and statistics collection can be at a plurality of a Media Access Control (MAC) layer, a Reconciliation Sublayer (RS), Optical Transport Network (OTN), Ethernet Physical Coding Sublayer (PCS), and a Physical (PHY) layer.

In a further embodiment, a network element configured for end-to-end data path integrity validation of a service with a data path at Layer 1 and Layer 2 includes one or more ports and a switch fabric configured to switch packets between the one or more ports; and a controller communicatively coupled to the one or more ports and the switch fabric, wherein the controller is configured to message between network elements in the data path via the one or more ports, responsive to initiation of a test, to coordinate defect and statistics collection at each of the network elements in the data path, receive results for the defect and statistics collection from each of the network elements in the data path, and summarize the received results to form a consolidated report for the test across all of the network elements in the data path. The received results can include statistics for each interface in the data path, and wherein the summarizing includes correlating the received results to provide a single view across the data path. The defect and statistics collection can be at a plurality of a Media Access Control (MAC) layer, a Reconciliation Sublayer (RS), Optical Transport Network (OTN), Ethernet Physical Coding Sublayer (PCS), and a Physical (PHY) layer.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 5-15 are block diagrams of the network elements in the Ethernet network of FIG. 1 illustrating an example operation of the data path integrity validation process of FIG. 2.

DETAILED DESCRIPTION OF THE DISCLOSURE

The present disclosure relates to systems and methods for end-to-end data path integrity validation at Layer 1 and Layer 2. The systems and methods verify the integrity of a data path which spans multiple network elements by collecting and summarizing end-to-end data path statistics and defect counts, along all interfaces in the data path, which are associated with a specific traffic service. Of note, the systems and methods validate the physical layer (Layer 1) integrity as well as Layer 2 (the data link layer) together. The systems and methods include messaging between network elements along the data path, in order to coordinate the initiation and termination of defect and statistics collection/validation messages. An initiating node may summarize the results received from all other nodes and provide a summary report for the test cycle. The results can be stored locally on the initiating node or can be transferred from the node to an external server, upon completion of the test or upon detection/crossing of failure threshold or defect. Tests can be configured to be run with a default failure threshold, but could also be configured to run with desired pass/fail criteria (such as with a specified Bit Error Rate (BER)).

The systems and methods can employ an encapsulation protocol such as IEEE 802.1q Virtual Local Area Network (VLAN) in order to encapsulate control frames (using the same technique of encapsulation as the service encapsulation) in order to coordinate and collect results. This allows the control frames to traverse the network data path following the same data path as the service under test, through network elements. The systems and methods can be used with other types of encapsulation and are not limited to IEEE 802.1q or 802.1ad encapsulation.

Raw statistics are available at many interfaces and at many different layers on optical transport network elements (e.g., Optical Transport Network (OTN), Ethernet Physical Coding Sublayer (PCS), Ethernet Media Access Control (MAC)). Typically, the statistics are available individually and are binned periodically per individual interfaces. Defects and alarms are reported per node, but conventionally they are not correlated per data path, i.e., no health/quality summary would typically be available for a particular end-to-end service's data path. The systems and methods can harvest individual interface statistics to correlate results and summarize this information for an end-to-end service's data path. The systems and methods can be implemented via an individual network element, a management system, etc. The systems and methods function when network elements contain Ethernet switches within their hardware data paths.

Figure 1:
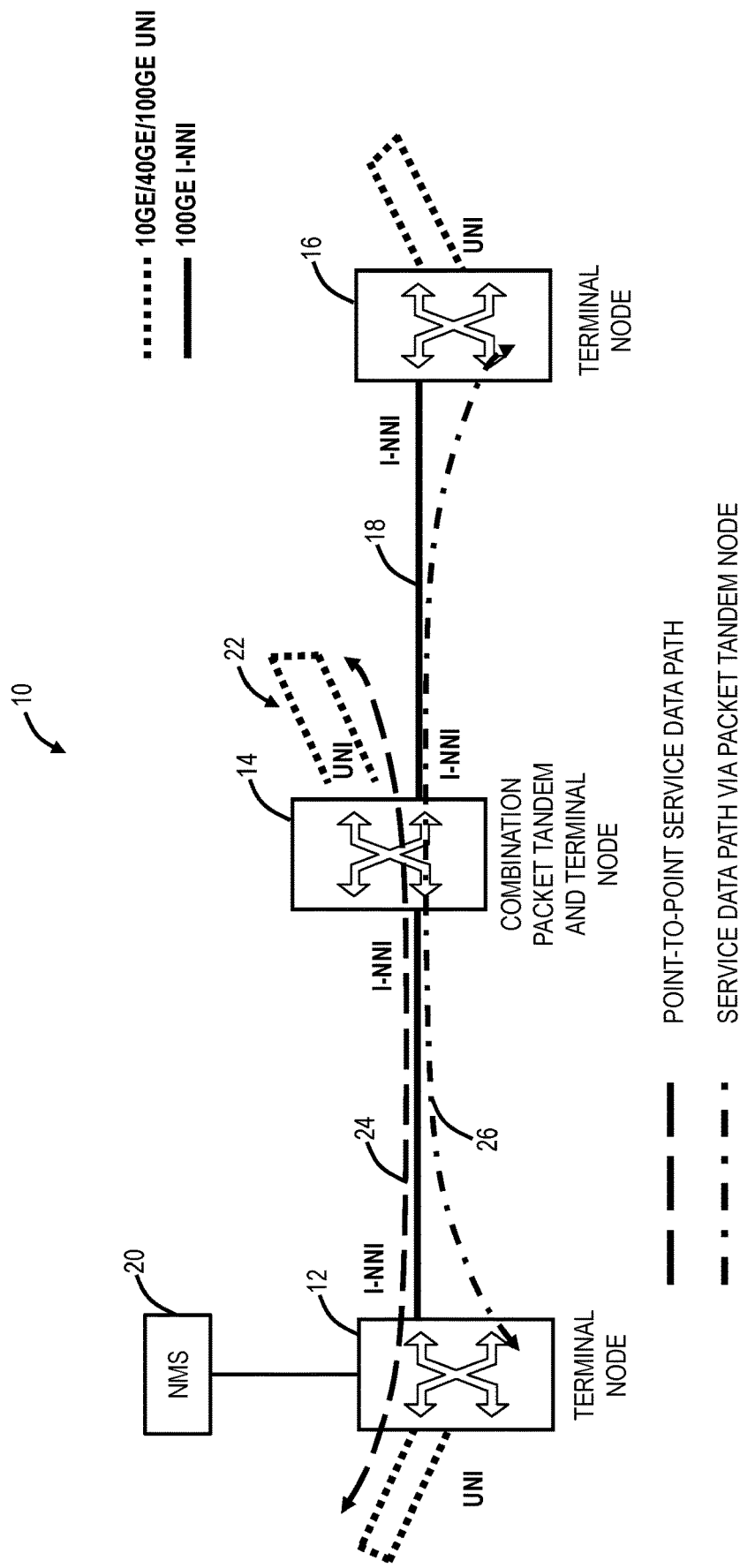
FIG. 1 is a network diagram of an Ethernet network with three network elements.

FIG. 1 is a network diagram of an Ethernet network 10 with three network elements 12, 14, 16. Variously, the network elements 12, 14, 16 can be Ethernet packet switches such as standalone switches, Packet Optical Transport Systems (POTS), and the like. This example network 10 includes a terminal network element 12 connected to a combination packet tandem and terminal network element 14 which is connected to a terminal network element 16. Thus, the network elements 12, 16 are endpoint nodes whereas the network element 14 is an intermediate node. The network elements 12, 14, 16 can be connected to one another via 100 Gigabit Ethernet (GbE) Internal Network-to-Network Interface (I-NNI) ports and links 18. Also, the network elements 12, 14, 16 can be communicatively coupled to a management system 20 for Operations, Administration, Maintenance, and Provisioning (OAM&P). The network elements 12, 14, 16 can also include User-Network Interface (UNI) ports 22, such as 10GbE, 40GbE, 100GbE, etc. Also, the UNI ports 22 can be configured as loopbacks. For example, the monitored data path for physical layer validation can include a complete data path should optical loopbacks be in place at "client" or UNI ports 22. The client TX (TX to RX) loopbacks (either external or internal) could also be used during the execution of this test.

The network 10 can include a point-to-point service 24 between the nodes 12, 14 with no intermediate Ethernet packet switches. Data path verification of the service 24 can include a test signal such as with loopbacks to determine physical layer statistics. The network 10 can also include a service 26 with a data path via the packet tandem network element 14, i.e., the service 26 is between the network elements 12, 16 with the intermediate packet tandem network element 14. As described herein, the service 26 is treated as two separate Ethernet services at the physical layer, namely an Ethernet connection between the network elements 12, 14 and between the network elements 14, 16. That is, the packet tandem network element 14 terminates any Ethernet connection such that a test signal cannot measure the physical layer characteristics end-to-end.

Variously, the systems and methods enable end-to-end data path integrity validation at Layer 1 and Layer 2 for the service 26 or the like. The systems and methods can use one or more test signals and associated statistics to create a status summary of the end-to-end data path. The systems and methods can distribute the work required on all of the network elements 12, 14, 16 as far as creating a status summary, which would offload the work from the initiating network element 12. The systems and methods can use existing statistics and status capabilities in order to monitor the required interfaces along the data path of the service 26. The systems and methods can use standards-based statistics and defects at all interfaces, in order to determine the results, during the test. Advantageously, the systems and methods can run test signals in-service in a non-intrusive manner (with the exception of the use of a very small percentage of bandwidth required for use in messaging).

Figure 2:
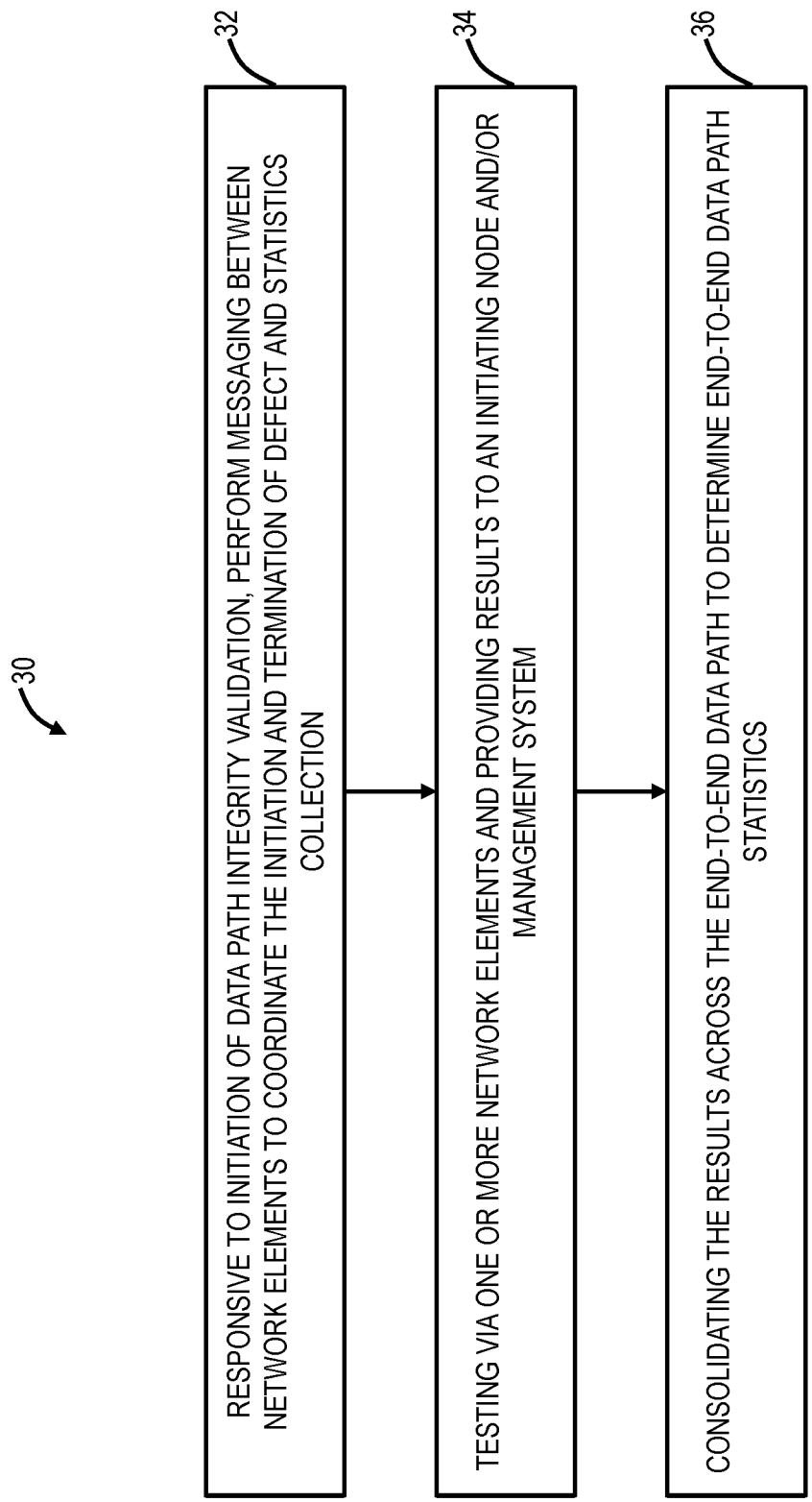
FIG. 2 is a flowchart of an end-to-end data path integrity validation process.

FIG. 2 is a flowchart of an end-to-end data path integrity validation process 30 which can be used to verify the service 26 in the network 10. Specifically, the end-to-end data path integrity validation process 30 can be implemented through various devices in the network 10 including the network elements 12, 14, 16 and/or the management system 20. The data path integrity validation process 30 includes, responsive to initiation of data path integrity validation, performing messaging between the network elements to coordinate the initiation and termination of defect and statistics collection (step 32). Next, the data path integrity validation process 30 includes testing portions of the data path via one or more network elements and providing results to an initiating node and/or management system (step 34). Finally, the data path integrity validation process 30 includes consolidating the results across the end-to-end data path to determine end-to-end data path statistics (step 36).

The data path integrity validation process 30 verifies the integrity of a data path which spans multiple network elements 12, 14, 16 by collecting and summarizing end-to-end data path statistics, along all interfaces in the network 10, which are associated with a specific traffic service 26. The data path integrity validation process 30 involves messaging between network elements 12, 14 along the data path, in order to coordinate the initiation and termination of defect and statistics collection/validation messages. An initiating network element 12 may summarize the results received from all other network elements 14, 16 and provide a summary report for the test cycle. The results can be stored locally on the initiating network element 12 or can be transferred off the network element 12 to an external server such as the management system 20, upon completion of the test or upon detection/crossing of failure threshold or defect. Tests can be configured to run with a default failure threshold, but could also be configured to run with the desired pass/fail criteria (such as a specified Bit Error Rate (BER)).

The data path integrity validation process 30 can use an encapsulation protocol such as IEEE 802.1q Virtual Local Area Network (VLAN) in order to encapsulate control frames (using the same technique of encapsulation as the service encapsulation) in order to coordinate and collect results. This allows the control frames to traverse the network data path by following the same data path as the service 26 under test, through the network elements 12, 14, 16. The data path integrity validation process 30 can be used with other types of encapsulation and is not limited to IEEE 802.1q or 802.1ad encapsulation.

During a test mode, each participating node will send periodic updates for all relevant statistics and defects with an additional status summary for the interval (clear status when no traffic affecting statistics are present, yellow status when some traffic affecting statistics are present but below a fail threshold, and red status when traffic affecting statistics are present and a fail threshold has been exceeded).

Based on the service configuration, all relevant ports can be monitored. In some cases, depending on the service model, two I-NNI interfaces may be monitored, but only one I-NNI interface may be currently in use for the service. However, monitoring all relevant I-NNI interfaces will ensure test results are ensured regardless of future dynamic network reconfigurations beyond the scope of the node. It may be possible or desirable to also simply follow the current service data path only. Multiple service tests can be run simultaneously.

Inputs to the analysis can include all ingress monitoring statistics. These include statistics at various layers including Optical Transport Network (OTN), Physical Coding Sublayer (PCS), and Media Access Control (MAC) layers. The test mode can be run either "in-service" with live traffic running or "out of service" with the use of an IEEE 802.3 scrambled idle test-pattern running on each of the relevant interfaces. The test results for the entire service data path can be available for query through various management interfaces (Command Line Interface (CLI), Representational state transfer (REST), Network Configuration Protocol (NETCONF), Simple Network Management Protocol (SNMP), g Remote Procedure Call (gRPC) etc.) from the initiating node. The test results can be summarized and stored locally or automatically exported from the initiator via supported File Transfer Protocols (FTP, etc.).

Figure 3:
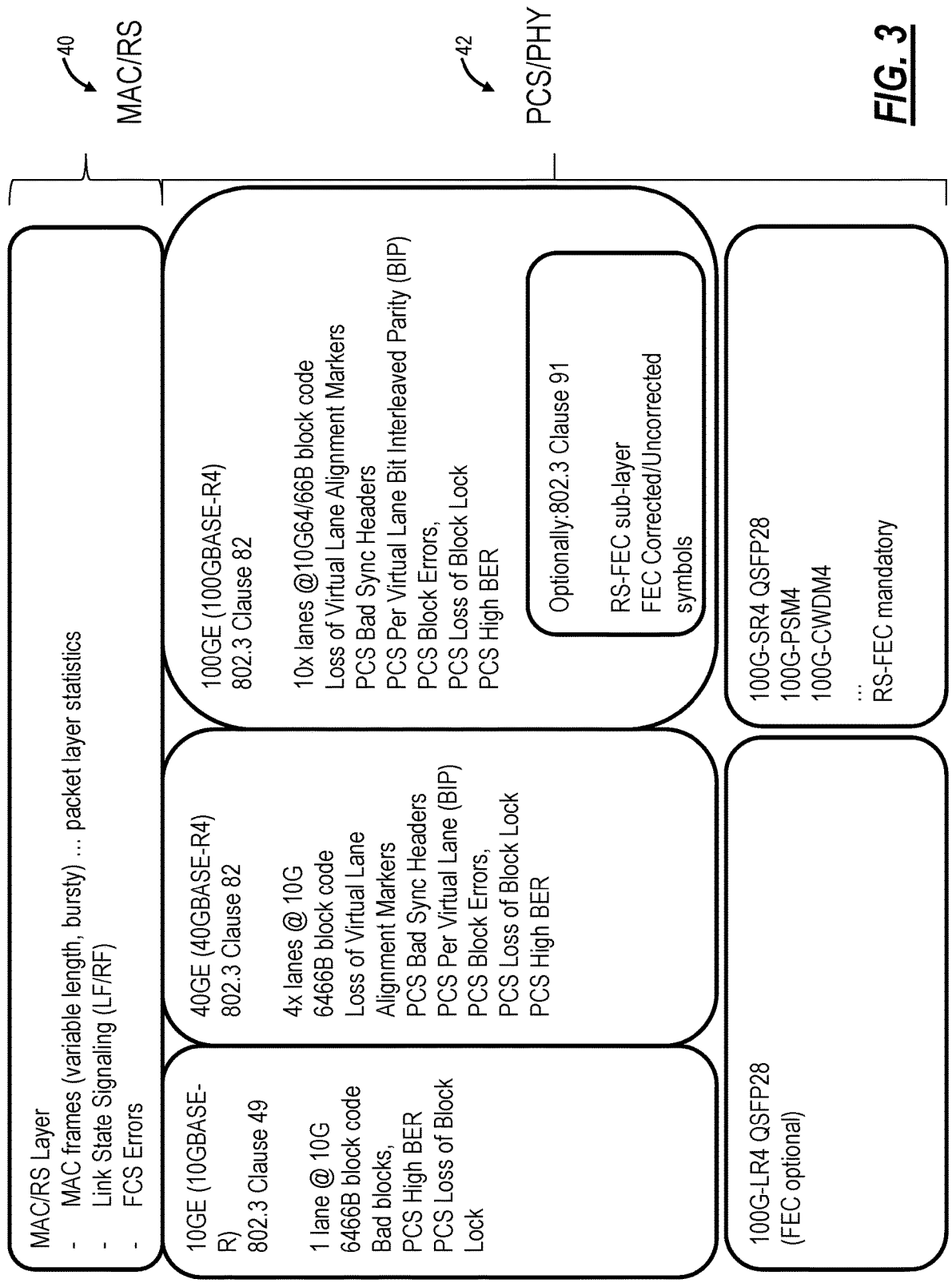
FIG. 3 is a logical diagram of various monitoring points for the data path integrity validation process for various Ethernet speeds and feeds.

FIG. 3 is a logical diagram of various monitoring points for the data path integrity validation process 30 for various Ethernet speeds and feeds. For physical layer characteristics, the data path integrity validation process 30 can monitor statistics as the MAC or Reconciliation Sublayer (RS) 40 and at the PCS or Physical (PHY) layer 42. At the MAC/RS layer 40, there are packet layer statistics based on MAC frames (which have variable lengths, are bursty, etc.) and there is Link State Signaling (Local Fault (LF), Remote Fault (RF)).

At the PCS/PHY layer 42, the statistics are based on the different PCS implementations, e.g., 10GbE (10GBase-R), 40GbE (40GBase-R4), 100GbE (100GBase-R4), etc., and the different physical implementations, e.g., QSFP+plugs, 100G-LR4 QSFP28, 100G-SR3, 100G-PSM4, etc. Note, although the descriptions include optical transport, the systems and methods described herein can also work for electrical equivalent transceivers.

The following provides a list of some PCS layer defects that could be monitored as part of the test (per segment). These would be lower level than the defects covered by the MAC layer (MAC layer would cover Frame Check Sequence (FCS) errors, oversized and undersized frames, jitter, also throughput/latency).

Physical Coding Sublayer (PCS) Layer Defects and Counters—10GBASE-R, 40GBASE-R, and 100GBASE-R are all based on a 64B/66B coding scheme. The PCS layer may use one (in the case of 10GBASE-R) or multiple serial streams, one encoded bit stream for 10GEBASE-R, four encoded bit streams for a 40GBASE-R PCS, or 20 encoded bit streams for a 100GBASE-R PCS. Alignment to 64B/66B blocks is performed in the PCS layer. The PCS maps XLGMII/CGMII signals into 66-bit blocks, and vice versa, using a 64B/66B coding scheme. The synchronization headers of the blocks allow the establishment of block boundaries by the PCS Synchronization process. The PCS functions ENCODE and DECODE generate, manipulate, and interpret blocks. Blocks include 66 bits. The first two bits of a block are the synchronization header (sync header). Blocks are either "data blocks" or "control blocks." Once the data is encoded and scrambled, it is distributed to multiple PCS lanes, 66-bit blocks at a time in a round robin distribution from the lowest to the highest numbered PCS lanes. In order to support deskew and reordering of individual PCS lanes at the receive PCS, alignment markers are added periodically to each PCS lane.

For the case of 100GBASE-SR4/CWDM4 (or in general any 100G-R interface), the actual coding scheme is 256B/257B.

In order to monitor the health of the PCS layer, several defect indications are required as per the standard.

Per Lane—Loss of PCS Block Lock Defect (40GE and 100GE only)—A block lock process operates independently on each lane. Each block lock process looks for 64 valid sync headers in a row to declare lock. A valid sync header is either a 01 or a 10. Once in lock, the lock process looks for 65 invalid sync headers within a 1024 sync window to declare out of lock. An invalid sync header is an 11 or 00. Once block lock is achieved on a lane, then the alignment marker process starts. Loss of Block Lock Defect can exist for each of the PCS Virtual Lanes (One Lane in 10GE, Four Lanes in 40GE and 20 Lanes in 100GE).

Per Lane—Loss of Alignment Marker Defect (40GE and 100GE only)—The alignment marker has the form of a specially defined 66-bit block with a control block sync header. These markers interrupt any data transfer that is already in progress. This allows alignment markers to be inserted into all PCS lanes at the same time. The alignment markers shall be inserted after every 16383 66-bit blocks on each PCS lane. Once block synchronization is found on a PCS lane, then alignment marker lock can be attained by searching for valid alignment markers. After alignment markers are found on all PCS lanes, the PCS lanes can be reordered and deskewed. Loss of Alignment Lock can exist for each of the PCS Virtual Lanes (4 lanes in 40GE and 20 lanes in 100GE).

Per Port—Loss of Alignment Marker Defect (40GE and 100GE only)—This defect is raised if a Loss of Alignment defect exists on any lane and clears when there are no Loss of Alignment defects on any lane, for a given port.

Per Port—Loss of Block Lock Defect—This defect is raised if a Loss of Block Lock defect exists on any lane and clears when there are no Loss of Block Lock defects on any lane, for a given port.

Per Port—High BER Defect (40GE and 100GE only)—A BER Monitor monitors the received aggregate signal for high bit error ratio. For BASE-R, when read as a one, the defect is raised when the 64B/66B receiver is detecting a BER of $\geq 10^{-4}$.

Per Port—Bad Sync Header Counter—A counter provides a measure of the number of invalid sync headers received on a given port.

Per Port—Errored Block Counter—A counter provides a measure of how many errored blocks have been received on a given port.

Per Lane—Multi-lane BIP error counter (40GE and 100GE)—A PCS lane Bit Interleaved Parity (BIP) field is carried in each PCS Lane alignment marker. This allows an accurate and fast measure of the bit error ratio of a given PCS Lane. This information is used to update error counters; no state machines use this information. Each alignment marker has two Bit Interleaved Parity fields, BIP3 and BIP7. BIP7 is a bit-wise inversion of BIP3, in order to keep the alignment marker DC-balanced. The BIP3 field contains the result of a bit interleaved parity calculation. Each bit in the BIP field is an even parity calculation over all of the previously specified bits of a given PCS Lane, from and including the previous alignment marker, but not including the current alignment marker.

FEC Layer Counters are only valid when FEC is enabled.

FEC Corrected Blocks Counter—A count of blocks containing errors that were corrected by the FEC function.

FEC Uncorrected Blocks Counter—A count of blocks containing errors that were not corrected by the FEC function.

Per Lane—FEC LaneX Symbol Error Counters—A count for each 10-bit symbol error detected.

Figure 4:
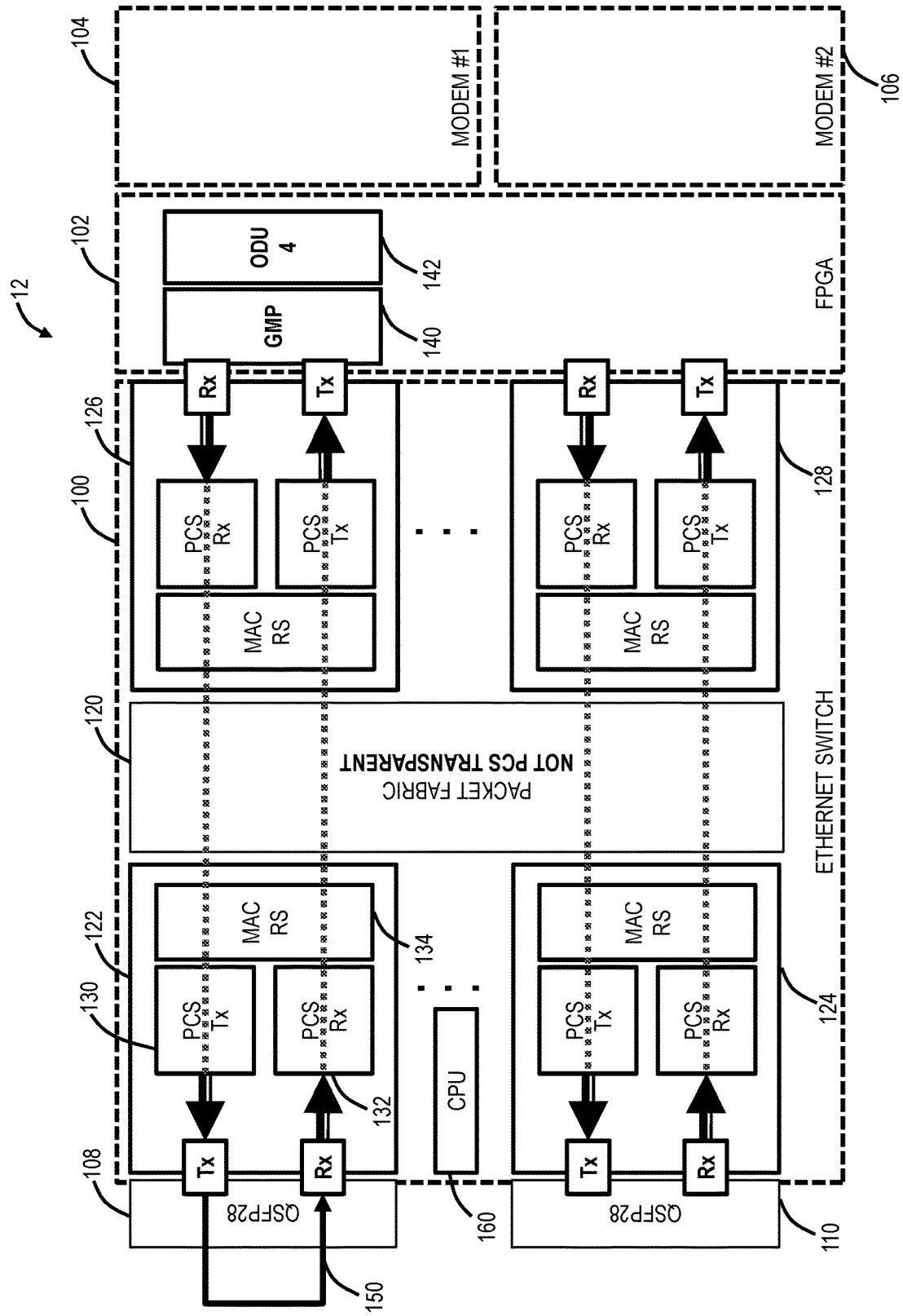
FIG. 4 is a block diagram of the network element in a test setup.

FIG. 4 is a block diagram of the network element 12 in a test setup. The network element 12 includes an Ethernet switch 100, framing circuitry 102, optical modems 104, 106 facing the network (I-NNI side), and client interfaces 108, 110 facing a client (UNI side). As described herein, the network element 12 supports Layers 0, 1, and 2, namely packet to Time Division Multiplexing (TDM) framing such as OTN to the photonic layer.

The Ethernet switch 100 includes a packet switch fabric 120 which is not PCS transparent and interface circuitry 122, 124, 126, 128 between the packet switch fabric 120, the framing circuitry 102, and the client interfaces 108, 110. Specifically, the interface circuitry 122, 124 is between the packet switch fabric 120 and the client interfaces 108, 110, and the interface circuitry 126, 128 is between the packet switch fabric 120 and the framing circuitry 102. The interface circuitry 122, 124, 126, 128 includes PCS Tx circuitry 130, PCS Rx circuitry 132, and MAC/RS circuitry 134 each performing various functions at the PCS, MAC, and RS layers.

The framing circuitry 102 is configured to perform OTN framing and optionally FEC between the interface circuitry 126, 128 and the optical modems 104, 106. For example, the framing circuitry 102 can include Generic Mapping Protocol (GMP) circuitry 140 and Optical Data Unit level 4 (ODU4) circuitry 142.

The client interfaces 108, 110 can be QSFP28 compliant pluggable transceivers. For example, the network element 12 can include a 100G-LR4 QSFP28 external loopback 150.

Further, the network element 12 can include a processor 160 communicatively coupled to various circuitry in the network element 12 and configured to control operational aspects of the network element 12.

Figure 5:
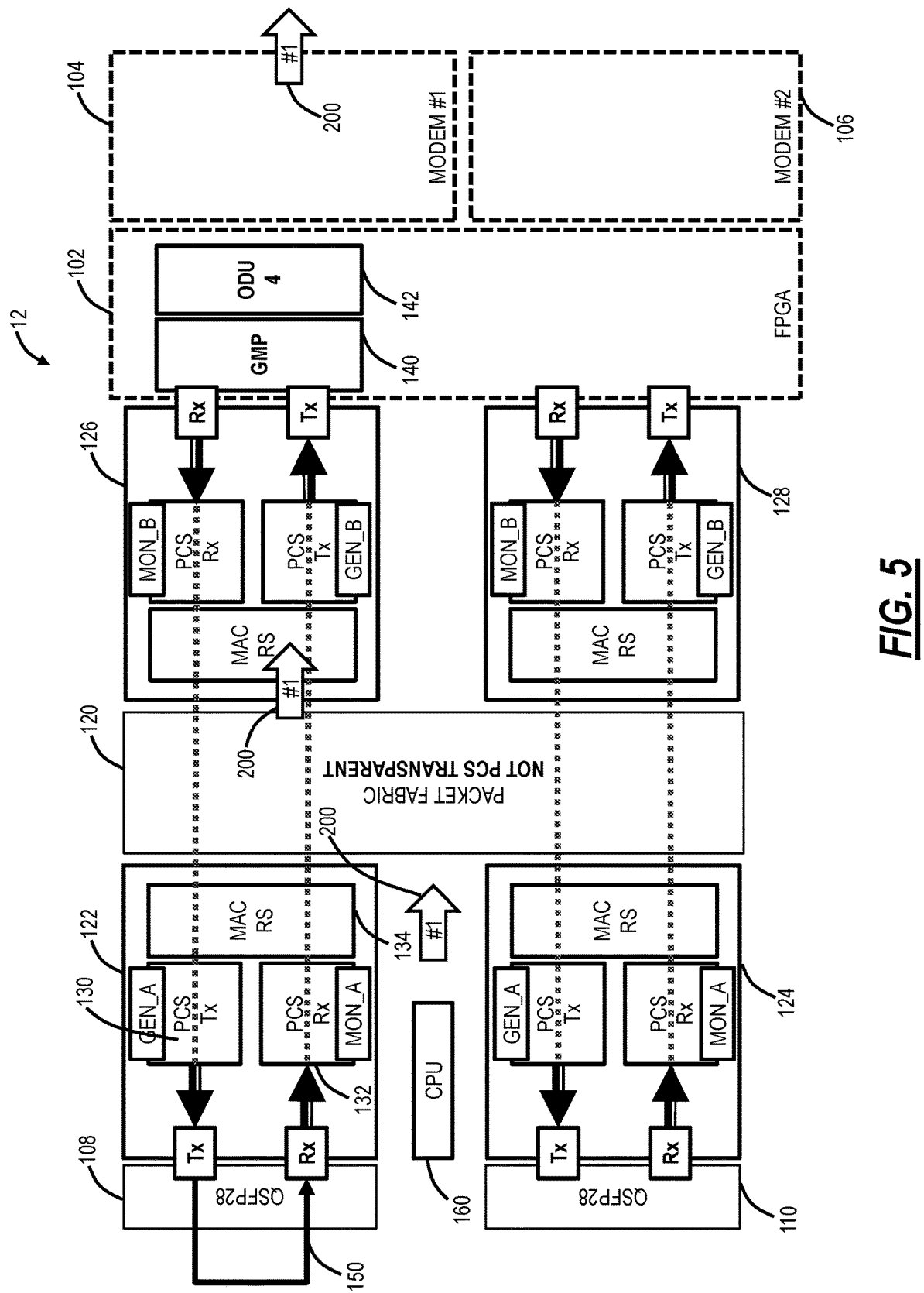

FIGS. 5-15 are block diagrams of the network element 12, 14, 16 illustrating an example operation of the data path integrity validation process 30. In FIG. 5, the network element 12 is illustrated in an initiation phase. Here, a command is provided to the network element 12 to initiate the validation process 30 which is initiated from the processor 160 causing a multicast "check" message 200 out of the line port associated with the data path of the service. These messages are used to verify that other network elements 14, 16 which are part of the data path are ready to begin a test cycle. Note, the PCS Tx circuitry 130 can include generator circuitry to initiate messages, and the PCS Rx circuitry 132 can include monitor circuitry to receive messages.

Figure 6:
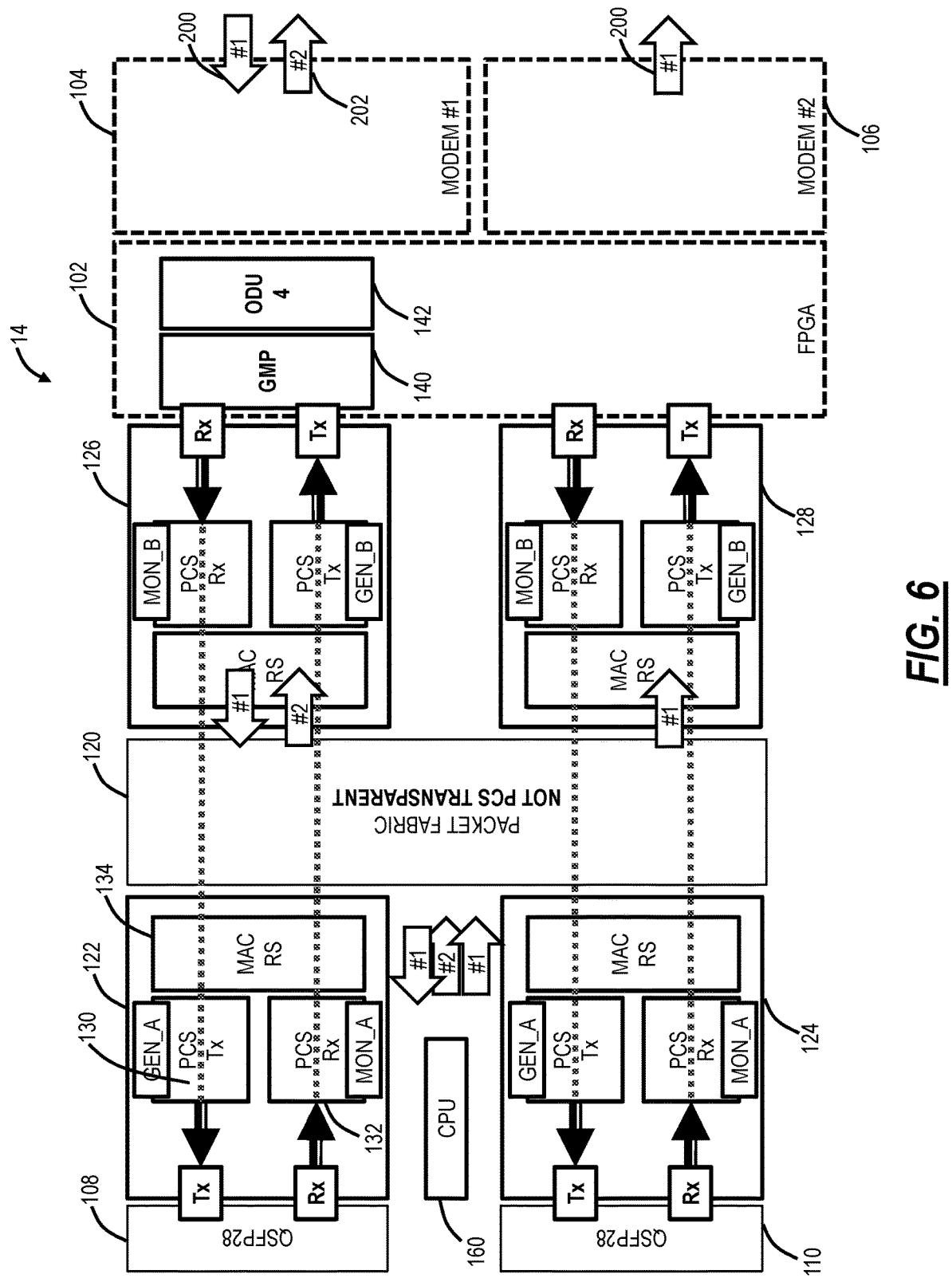

In FIG. 6, the network element 14 (packet tandem node) is illustrated in the initiation phase. The packet tandem node forwards the "check" message 200 out the other line port (following the service data path) and the packet tandem node also sends a unicast reply message 202 to the test mode initiator node, i.e., the network element 12 in this example.

Figure 7:
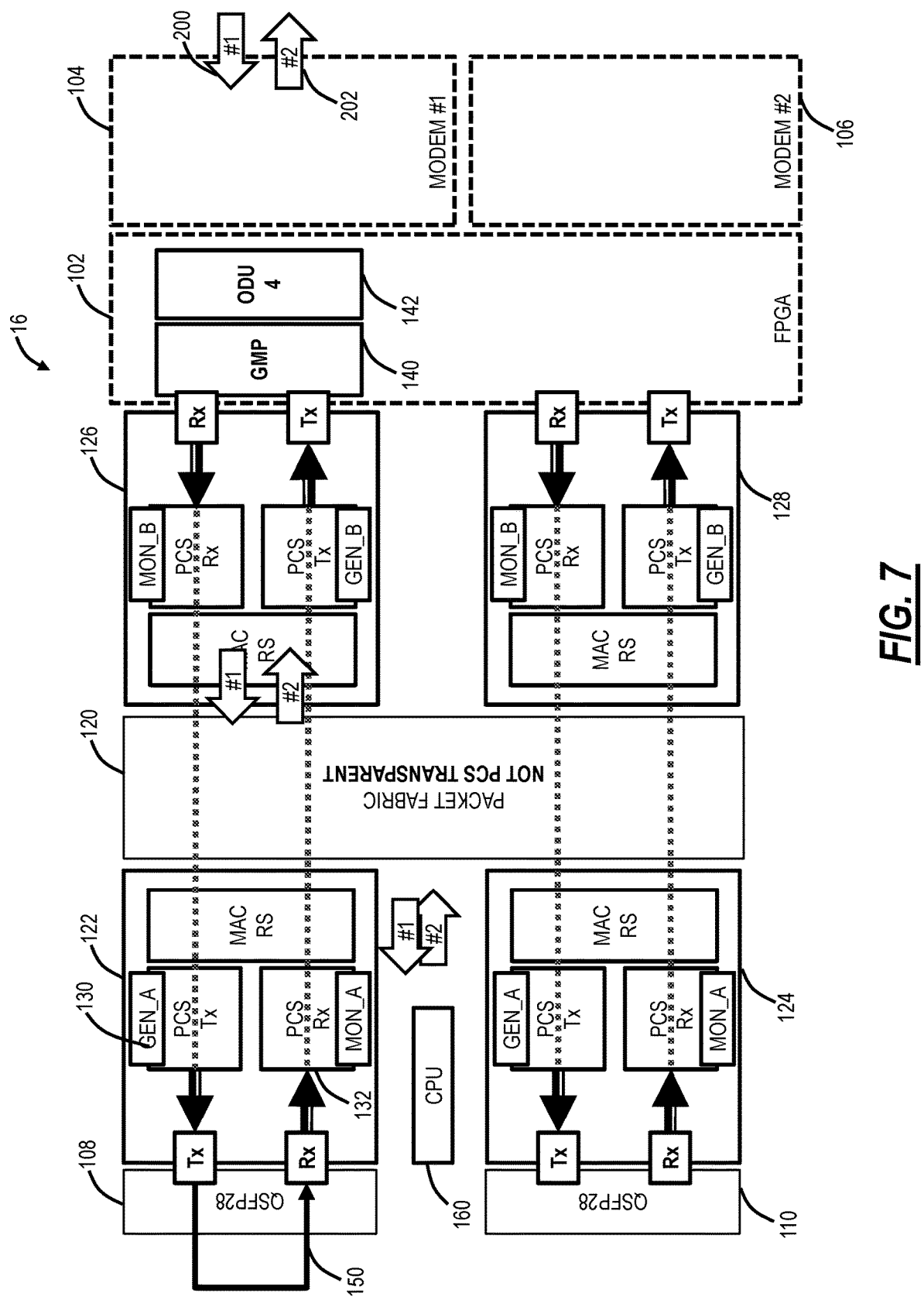

In FIG. 7, the network element 16 is illustrated in the initiation phase. The network element 16 receives the "check" message 200 and sends a unicast reply message 202 to the test mode initiator node, i.e., the network element 12 in this example.

Figure 8:
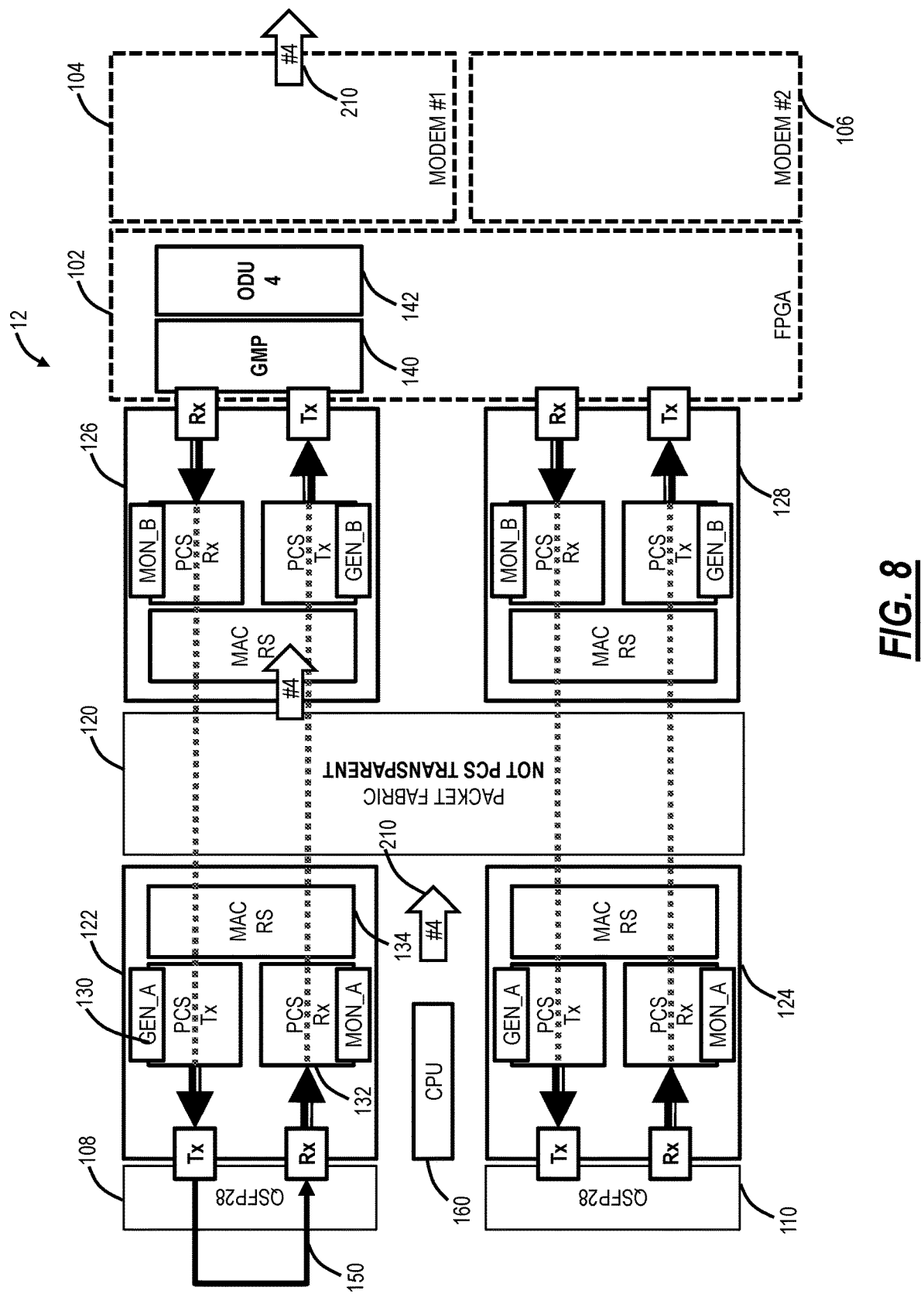

In FIG. 8, the network element 12 is illustrated for starting a test after the initiation phase. Specifically, the network element 12 has received all of the unicast reply messages 202 from the network elements 14, 16 indicating the successful receipt and acknowledgment of the "check" message 200. The network element 12 as the initiator sends a multicast "start" message 210 out the line port, following the associated service data path 26. The "start" message can include a test duration specification.

Figure 9:
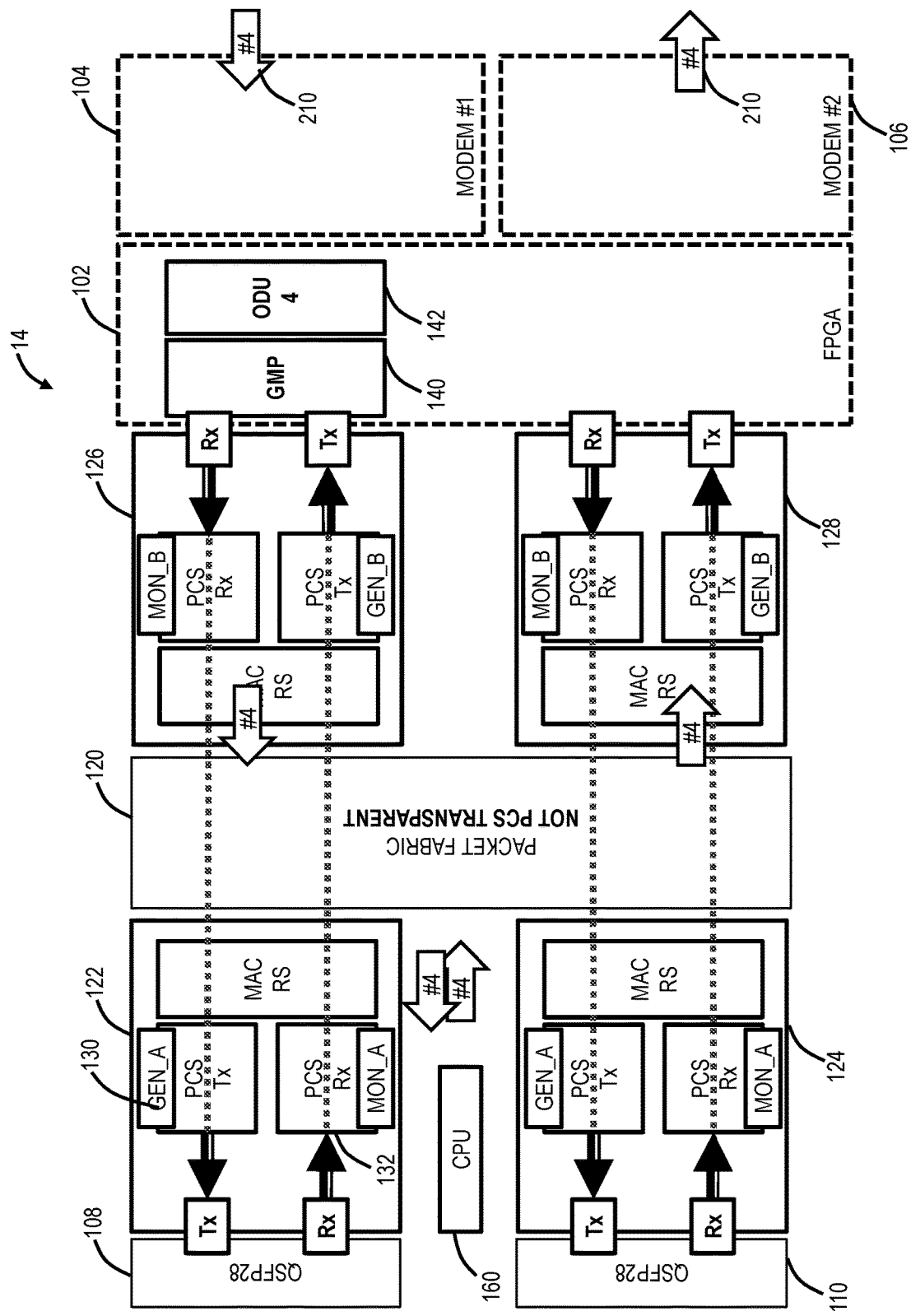

In FIG. 9, the network element 14 (packet tandem node) is illustrated for starting the test. The packet tandem node forwards the "start" message 210 out other the line port, following the associated service data path. Also, the packet tandem node enables a test mode in response to the "start" message 210.

Figure 10:
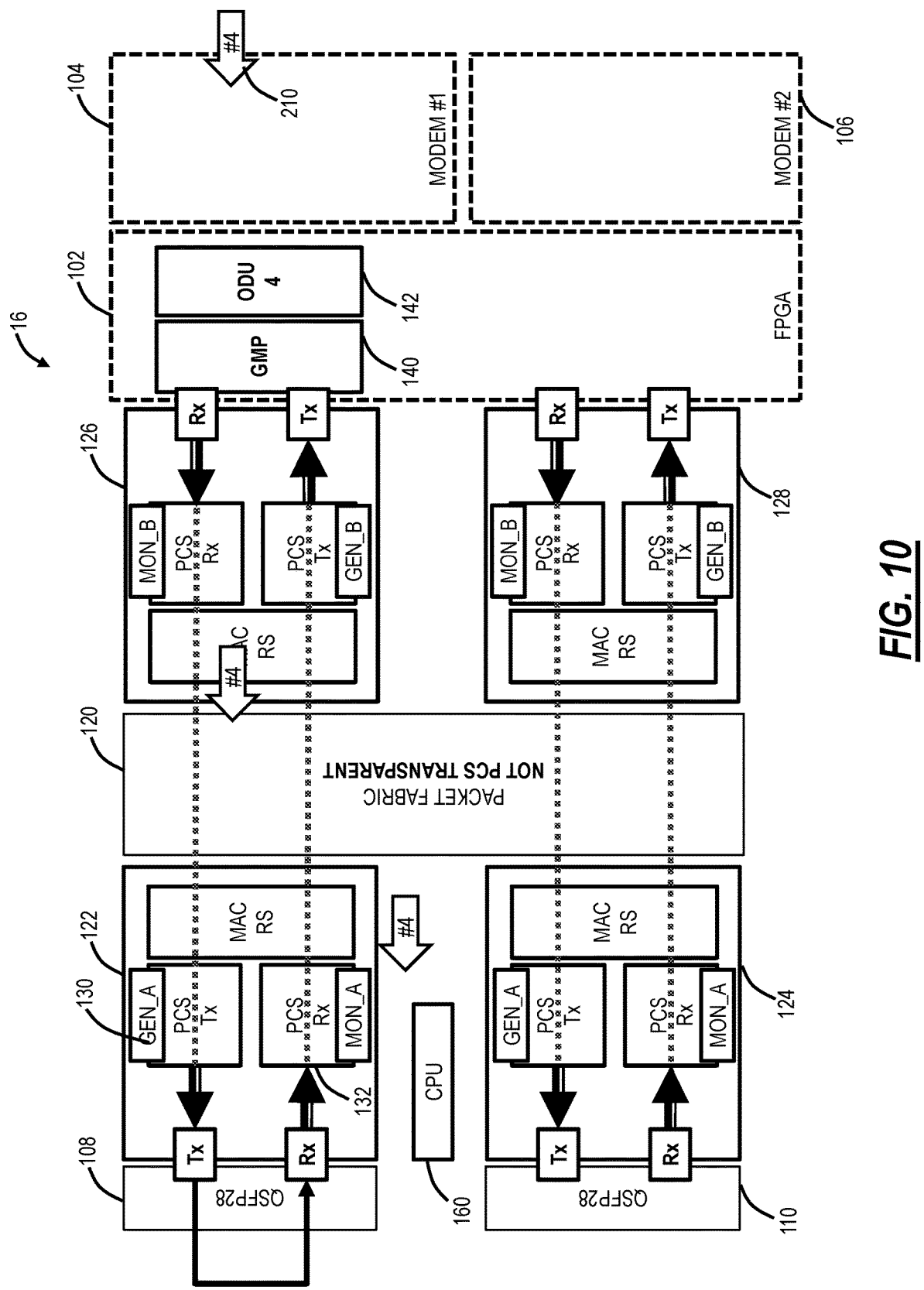

In FIG. 10, the network element 16 is illustrated for starting the test. The network element 16 enables the test mode in response to the "start" message 210.

Figure 11:
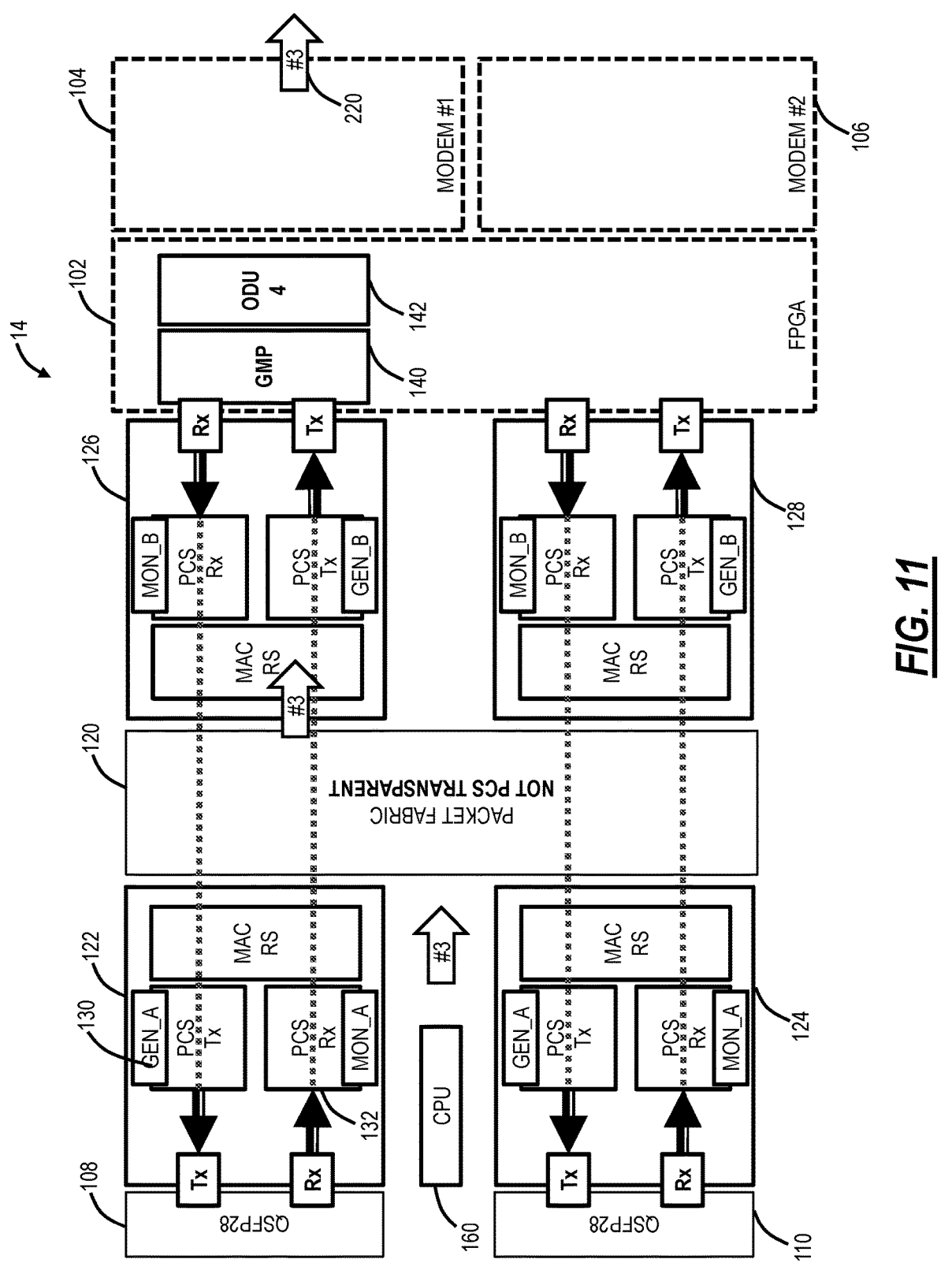

In FIG. 11, the network element 14 (packet tandem node) is illustrated in a test mode. The network element 14 sends periodic unicast "result" messages 220 back to the initiator, i.e., the network element 12 in this example. The network element 14 stops sending periodic messages when test duration completes or in response to a "cancel" message from the initiator. Processing of "cancel" messages is similar to processing "check" messages illustrated hereinabove. The "result" messages 220 can contain pass/fail status summary, Rx statistics, defects info, and the like.

Figure 12:
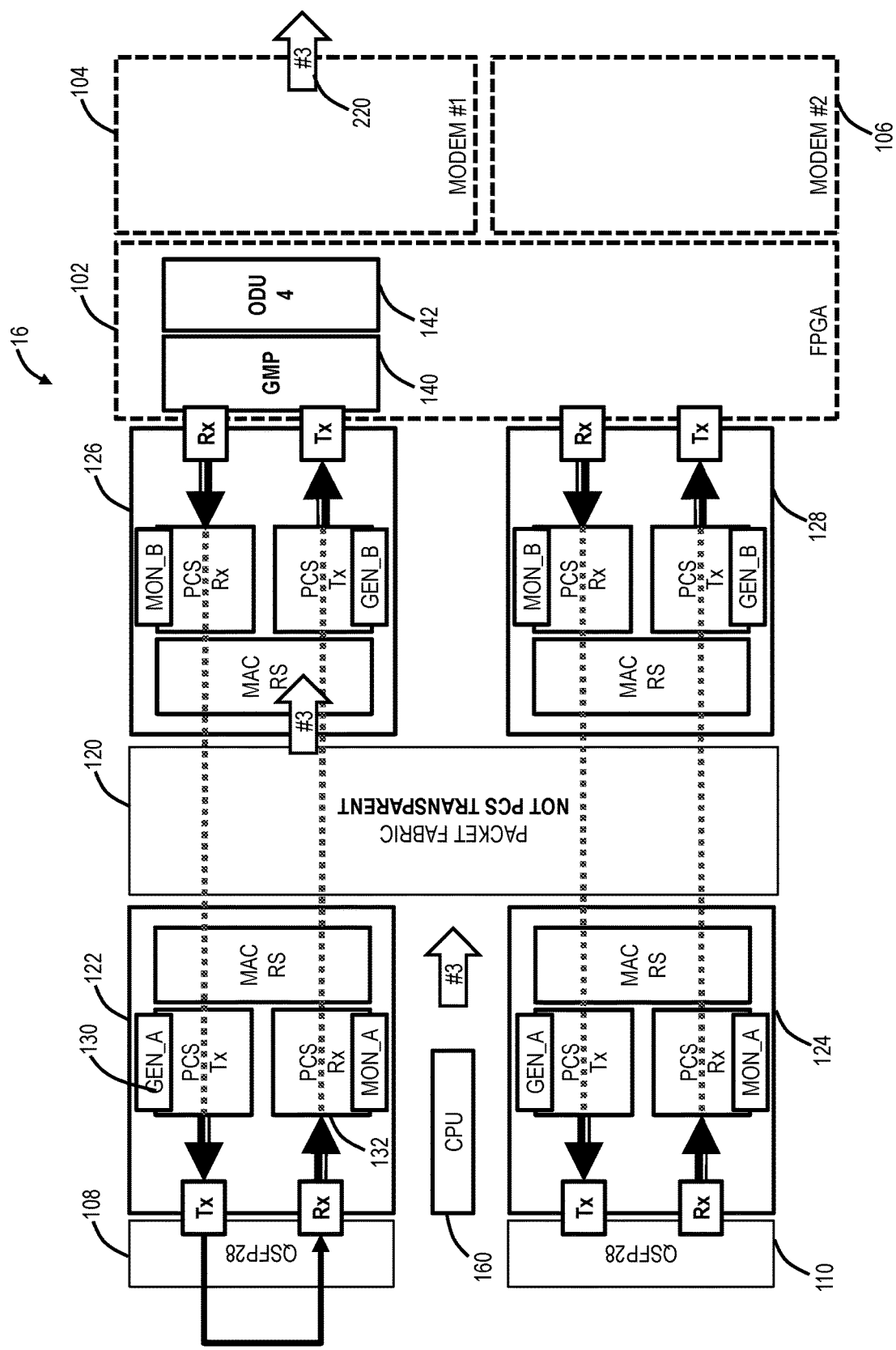

In FIG. 12, the network element 16 is illustrated in the test mode. The network element 16 sends periodic unicast "result" messages 220 back to the initiator, i.e., the network element 12 in this example. The network element 16 stops sending periodic messages when the test duration completes or in response to a "cancel" message from the initiator. The "result" messages 220 can contain pass/fail status summary, Rx statistics, defects info, and the like.

Figure 13:
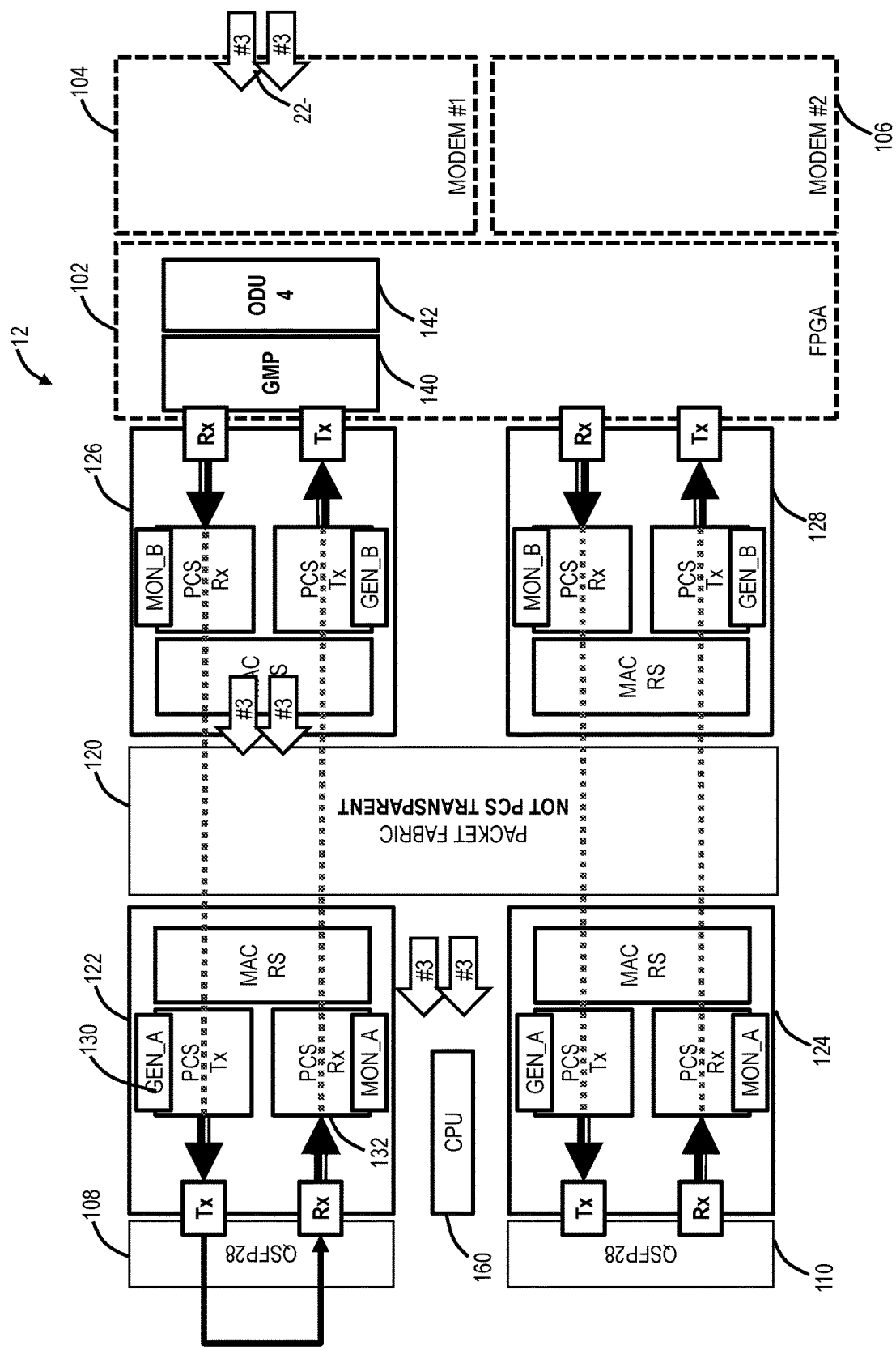

In FIG. 13, the network element 12 is illustrated in the test mode. The network element 12, as the initiator, receives periodic unicast "result" messages 220 back from the network elements 14, 16. The initiator can fail a test and/or cancel test mode, at any time, based on results from the network elements 14, 16. The initiator detects status messages and correlates Rx statistics and defects to form a consolidated view of the end-to-end data path.

Figure 14:
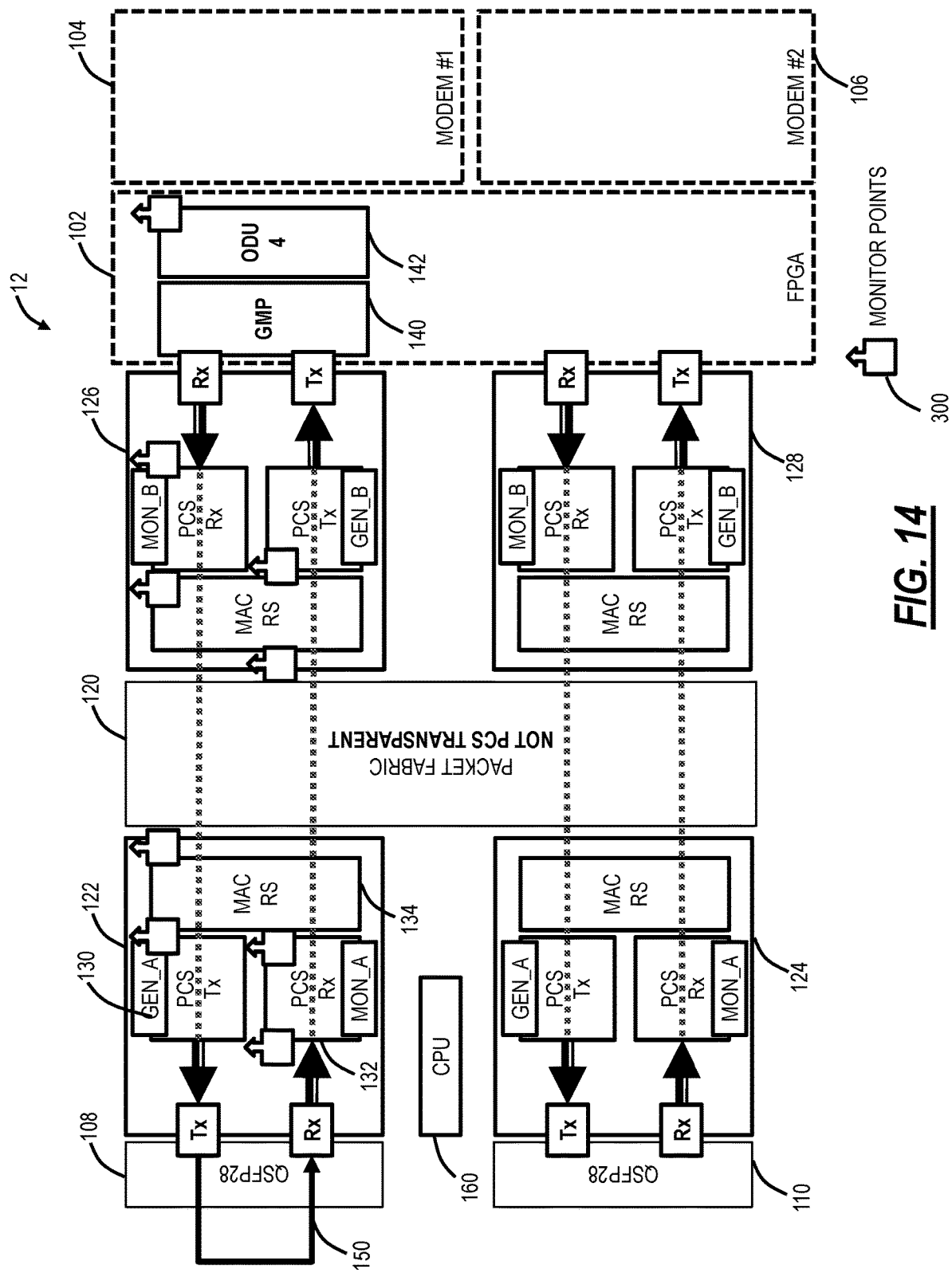
Figure 15:
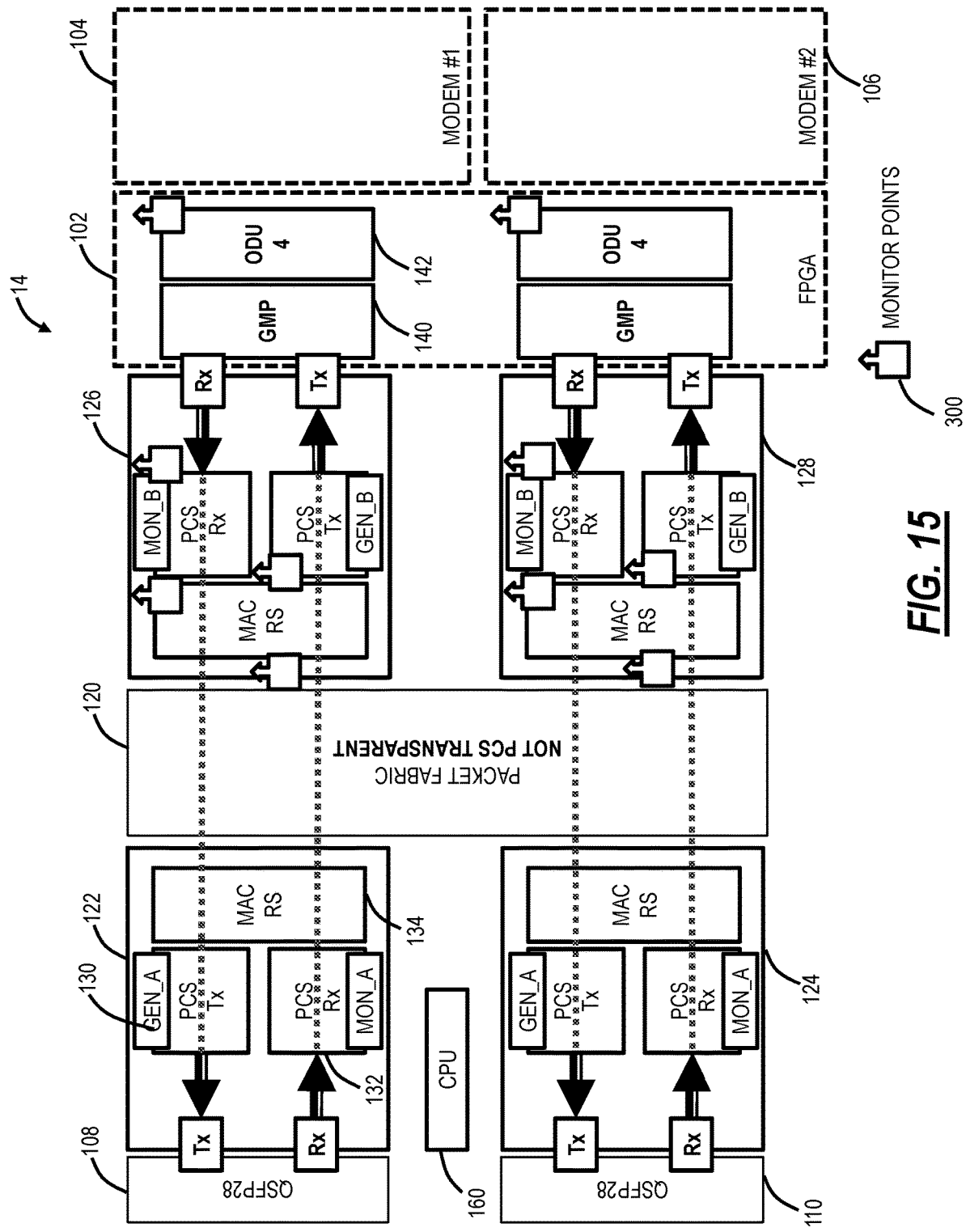

FIGS. 14 and 15 illustrate monitoring points 300 in the network elements 12, 14.

Figure 16:
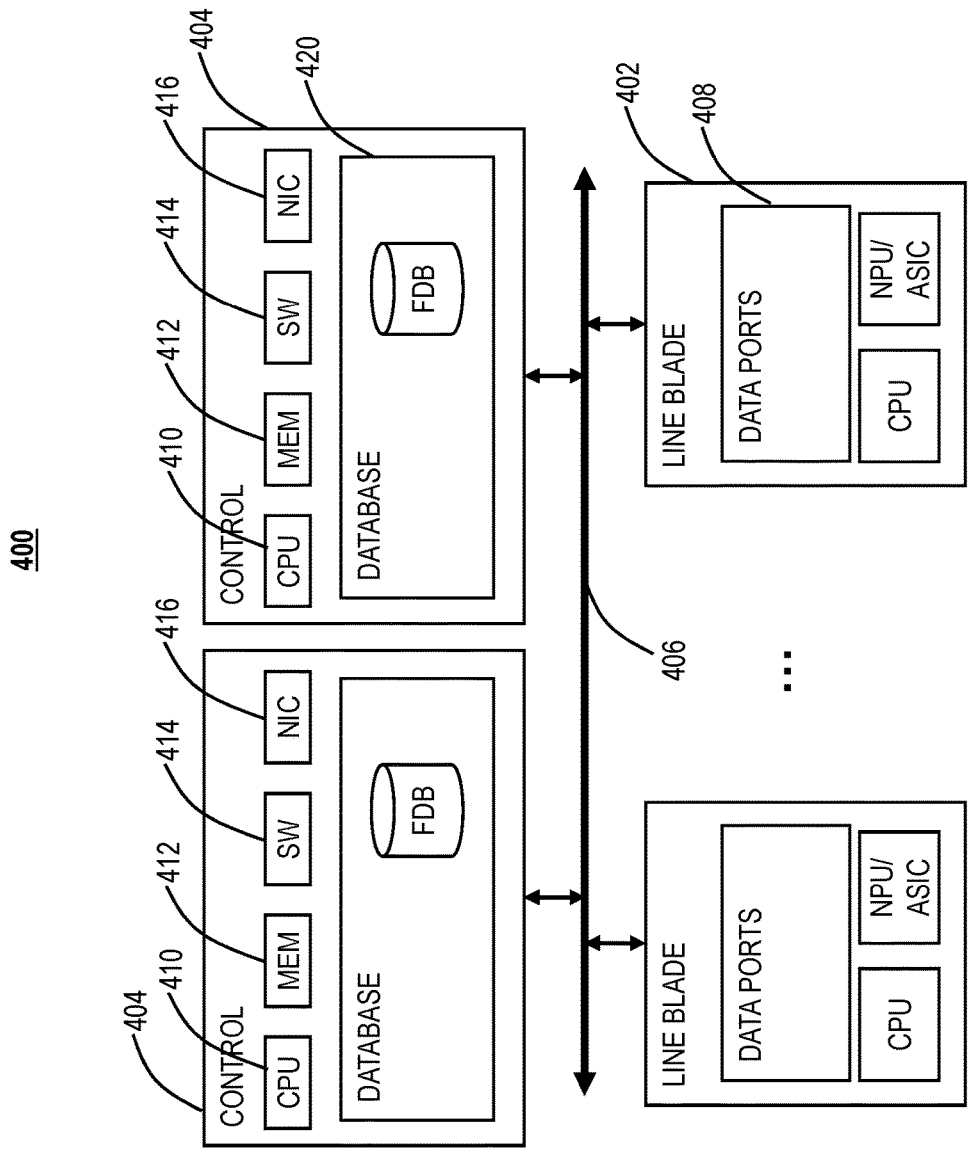
FIG. 16 is a block diagram of a network element for the systems and methods described herein.

FIG. 16 is a block diagram network element 400 for the systems and methods described herein. In this embodiment, the network element 400 is an Ethernet packet switch, but those of ordinary skill in the art will recognize the systems and methods described herein can operate with other types of network elements and other implementations, supporting Ethernet. In this embodiment, the network element 400 includes a plurality of blades 402, 404 interconnected via an interface 406. The blades 402, 404 are also known as line cards, line modules, circuit packs, pluggable modules, etc. and generally refer to components mounted on a chassis, shelf, etc. of a data switching device, i.e., the network element 400. Each of the blades 402, 404 can include numerous electronic devices and optical devices mounted on a circuit board along with various interconnects including interfaces to the chassis, shelf, etc. Those skilled in the art will recognize that the network element 400 is illustrated in an oversimplified manner and may include other components and functionality.

Two blades are illustrated with line blades 402 and control blades 404. The line blades 402 include data ports 408 such as a plurality of Ethernet ports. For example, the line blade 402 can include a plurality of physical ports disposed on an exterior of the blade 402 for receiving ingress/egress connections. Additionally, the line blades 402 can include switching components to form a switching fabric via the interface 406 between all of the data ports 408 allowing data traffic to be switched between the data ports 408 on the various line blades 402. The switching fabric is a combination of hardware, software, firmware, etc. that moves data coming into the network element 400 out by the correct port 408 to the next network element 400. "Switching fabric" includes switching units, or individual boxes, in a node; integrated circuits contained in the switching units; and programming that allows switching paths to be controlled. Note, the switching fabric can be distributed on the blades 402, 404, in a separate blade (not shown), or a combination thereof. The line blades 402 can include an Ethernet manager (i.e., a processor) and a Network Processor (NP)/Application Specific Integrated Circuit (ASIC).

The control blades 404 include a microprocessor 410, memory 412, software 414, and a network interface 416. Specifically, the microprocessor 410, the memory 412, and the software 414 can collectively control, configure, provision, monitor, etc. the network element 400. The network interface 416 may be utilized to communicate with an element manager, a network management system, etc. Additionally, the control blades 404 can include a database 420 that tracks and maintains provisioning, configuration, operational data and the like. In this embodiment, the network element 400 includes two control blades 404 which may operate in a redundant or protected configuration such as 1:1, 1+1, etc. In general, the control blades 404 maintain dynamic system information including packet forwarding databases, protocol state machines, and the operational status of the ports 408 within the network element 400.

Of note, the network element 400 is illustrated with a controller/blade architecture. However, those of ordinary skill in the art will recognize the line blades 402 and the control blades 404 can be combined in a single device or other hardware configurations.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, the software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of end-to-end data path integrity validation of a service with a data path at Layer 1 and Layer 2 implemented by a network element, the method comprising:
responsive to receipt of a command to initiate a test, sending a check message to verify network elements in the data path are ready to begin a test cycle;
upon receipt of a reply message from each of the network elements in the data path, messaging to the network elements in the data path to coordinate defect and statistics collection messages sent at each of the network elements in the data path,
wherein the network elements in the data path include two endpoints including the network element and at least one intermediate node,
wherein each of the other of the two endpoints and the at least one intermediate node sends a corresponding reply message, and
wherein the defect and statistics collection is at a plurality of layers including a data link layer and one or more of a Media Access Control (MAC), a Reconciliation Sublayer (RS) layer, an Ethernet Physical Coding Sublayer (PCS), and a Physical (PHY) layer;
receiving results for the defect and statistics collection from each of the network elements in the data path; and
summarizing the received results to form a consolidated report for the test across all of the network elements and across all of the plurality of layers in the data path,
wherein the consolidated report includes defects and alarms per node correlated across the data path at all of the plurality of layers,
wherein the received results comprise statistics for each interface in the data path, wherein the summarizing comprises correlating the received results to provide a single view across the data path, and
wherein the messaging is performed using an encapsulation protocol such that control frames take the same data path as the service.

2. The method of claim 1, further comprising:
reporting the consolidated report to a management system.

3. The method of claim 1, wherein the received results comprise one or more of a default failure threshold and a pass/fail criteria.

4. The method of claim 1, wherein the encapsulation protocol utilizes Virtual Local Area Network (VLAN).

5. The method of claim 1, wherein the test is performed in service with the service.

6. The method of claim 1, wherein the test is performed out of service with the service using an idle test pattern running on each associated interface for the service.

7. The method of claim 1, wherein the defect and statistics collection are further at Optical Transport Network (OTN).

8. The method of claim 1, wherein the messaging between network elements in the data path comprises
the network element sending check messages to each of the network elements in the data path,
the network element receiving reply messages from each of the network elements responsive to the check messages,
the network element sending start messages to each of the network elements in the data path, and
the network element receiving result messages from each of the network elements responsive to the start messages.

9. The method of claim 1, further comprising:
providing consolidated report to a management interface via any of Command Line Interface (CLI), Representational state transfer (REST), Network Configuration Protocol (NETCONF), Simple Network Management Protocol (SNMP), and a g Remote Procedure Call (gRPC).

10. The method of claim 1, wherein the test is performed for the service at a same time as another test for another service.

11. An apparatus configured for end-to-end data path integrity validation of a service with a data path at Layer 1 and Layer 2, the apparatus comprising:
circuitry configured to:
send a check message to verify network elements in the data path are ready to begin a test cycle, responsive to receipt of a command to initiate a test by the apparatus; and
message to the network elements in the data path, responsive to receipt, by the apparatus, of a reply message from each of the network elements in the data path, to coordinate defect and statistics collection messages sent at each of the network elements in the data path,
wherein the network elements include two endpoints and at least one intermediate node,
wherein each of the other of the two endpoints and the at least one intermediate node sends a corresponding reply message, and
wherein the defect and statistics collection is at a plurality of layers including a data link layer and one or more of a Media Access Control (MAC), a Reconciliation Sublayer (RS) layer, an Ethernet Physical Coding Sublayer (PCS), and a Physical (PHY) layer;
circuitry configured to receive results for the defect and statistics collection from each of the network elements in the data path; and
circuitry configured to summarize the received results to form a consolidated report for the test across all of the network elements and across all of the plurality of layers in the data path,
wherein the consolidated report includes defects and alarms per node correlated across the data path at all of the plurality of layers,
wherein the received results comprise statistics for each interface in the data path, wherein the summarizing comprises correlating the received results to provide a single view across the data path, and
wherein the messaging is performed using an encapsulation protocol such that control frames take the same data path as the service.

12. The apparatus of claim 11, wherein the test is performed in service with the service.

13. The apparatus of claim 11, wherein the defect and statistics collection are further at Optical Transport Network (OTN).

14. A network element configured for end-to-end data path integrity validation of a service with a data path at Layer 1 and Layer 2, the network element comprising:
one or more ports and a switch fabric configured to switch packets between the one or more ports; and
a controller communicatively coupled to the one or more ports and the switch fabric,
wherein the controller is configured to send a check message to verify network elements in the data path are ready to begin a test cycle;
message to the network elements in the data path via the one or more ports, responsive to receipt of a reply message from each of the network elements in the data path, to coordinate defect and statistics collection messages sent at each of the network elements in the data path,
wherein the network elements include two endpoints including the network element and at least one intermediate node,
wherein each of the other of the two endpoints and the at least one intermediate node sends a corresponding reply message, and
wherein the defect and statistics collection is at a plurality of layers including a data link layer and one or more of a Media Access Control (MAC), a Reconciliation Sublayer (RS) layer, an Ethernet Physical Coding Sublayer (PCS), and a Physical (PHY) layer,
receive results for the defect and statistics collection from each of the network elements in the data path, and
summarize the received results to form a consolidated report for the test across all of the network elements and across all of the plurality of layers in the data path,
wherein the consolidated report includes defects and alarms per node correlated across the data path at all of the plurality of layers,
wherein the received results comprise statistics for each interface in the data path, and wherein the summarizing comprises correlating the received results to provide a single view across the data path, and
wherein the messaging is performed using an encapsulation protocol such that control frames take the same data path as the service.

15. The network element of claim 14, wherein the defect and statistics collection are further at Optical Transport Network (OTN).

* * * * *